United States Patent [19]

Kawamoto

[11] 4,348,914

[45] Sep. 14, 1982

[54] MOUNTING STRUCTURE FOR A LUBRICATING OIL CHANNEL OF AN EXTENSION BUSHING

[75] Inventor: Tamio Kawamoto, Sagamihara, Japan

[73] Assignee: Nissan Motor Co., Ltd., Yokohama, Japan

[21] Appl. No.: 115,201

[22] Filed: Jan. 25, 1980

[30] Foreign Application Priority Data

Jan. 30, 1979 [JP] Japan .................................. 54-9861

[51] Int. Cl.³ ........................ F01M 9/10; F16H 57/04
[52] U.S. Cl. ...................................... 74/467; 184/6.12
[58] Field of Search ...................... 74/467; 24/201 C; 184/6.12, 7 R, 8, 9, 12; 403/381

[56] References Cited

U.S. PATENT DOCUMENTS

| | | | |
|---|---|---|---|
| 993,281 | 5/1911 | Todd | 24/201 C |
| 2,000,466 | 5/1935 | Howard | 24/201 C |
| 2,654,441 | 10/1953 | Orr et al. | |
| 2,774,609 | 12/1956 | Winger | 403/381 |
| 3,230,796 | 1/1966 | Thomson | 184/6.12 |
| 3,672,586 | 6/1972 | Morton | 184/6.12 |

FOREIGN PATENT DOCUMENTS

| | | |
|---|---|---|
| 2042206 | 3/1972 | Fed. Rep. of Germany . |
| 2531462 | 1/1977 | Fed. Rep. of Germany . |
| 485462 | 5/1938 | United Kingdom . |
| 842909 | 7/1960 | United Kingdom . |
| 1017798 | 1/1966 | United Kingdom . |
| 1091709 | 11/1967 | United Kingdom . |
| 1115446 | 5/1968 | United Kingdom .............. 184/6.12 |
| 1213052 | 11/1970 | United Kingdom . |
| 1297663 | 11/1972 | United Kingdom . |
| 1491988 | 11/1977 | United Kingdom . |

*Primary Examiner*—Lawrence J. Staab
*Attorney, Agent, or Firm*—Thompson, Birch, Gauthier & Samuels

[57] ABSTRACT

A mounting structure for a lubricating oil channel of a bushing of an extension for a transmission of a vehicle comprises a resilient cylindrical expansion anchor formed on a mid-portion of the channel and a cylindrical cavity formed in an inner wall of the extension for receiving therein the cylindrical expansion anchor which has been resiliently deformed, thereby securing the lubricating oil channel to the inner wall of the extension in a single operation without requiring any fastening means such as set screws or rivets.

3 Claims, 10 Drawing Figures

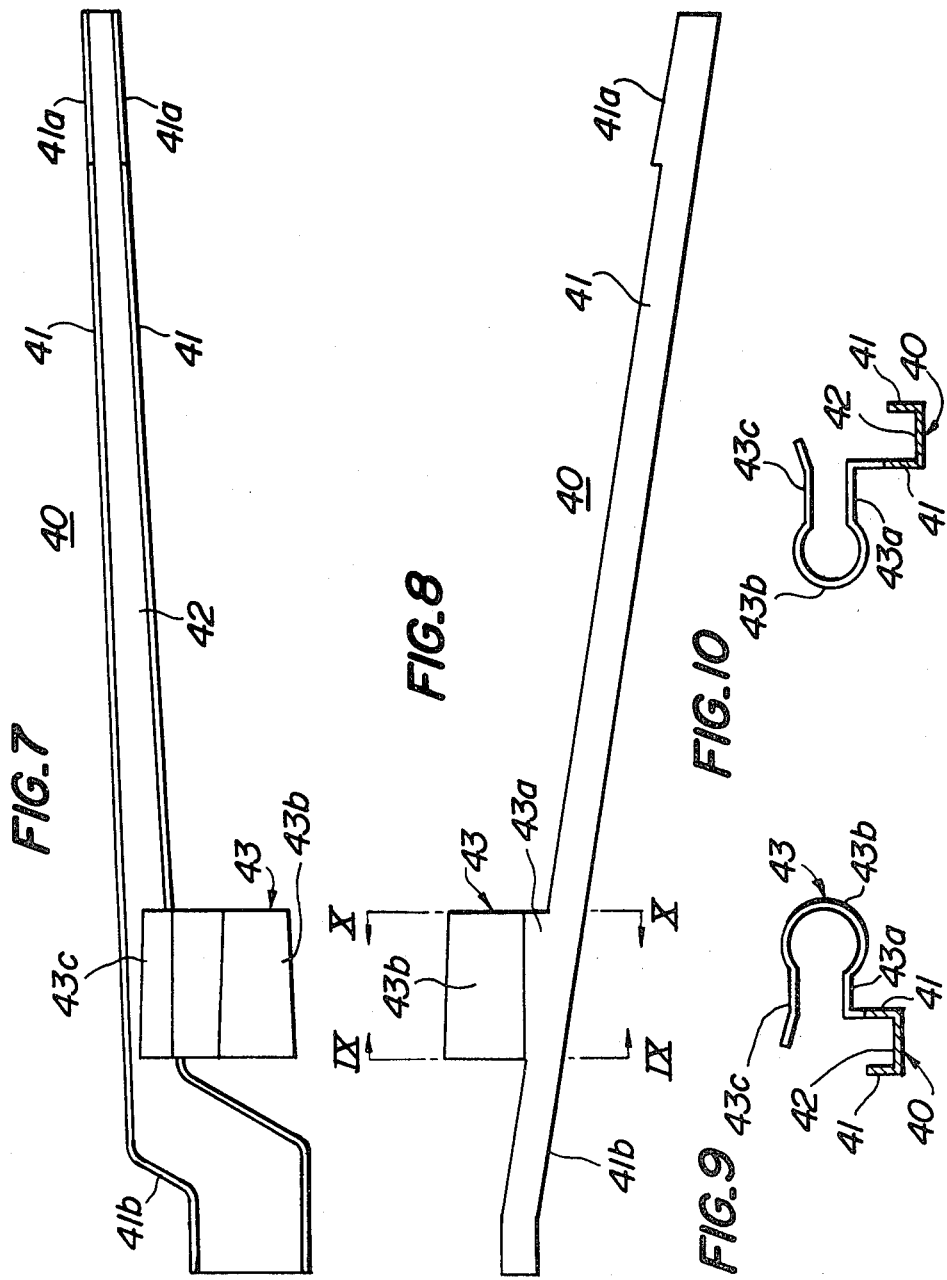

MOUNTING STRUCTURE FOR A LUBRICATING OIL CHANNEL OF AN EXTENSION BUSHING

BACKGROUND OF THE INVENTION

1. Field of the Invention

The present invention relates to a mounting structure for a lubricating oil channel for an extension bushing of a transmission of a vehicle.

2. Description of the Prior Art

An extension forming a part of a gear casing of a transmission rotatably journals a front end of a main shaft or propeller shaft with a bushing which requires lubricating oil for the shaft. The oil is introduced thereto from a reservoir formed in a part of the gear casing through a channel secured thereto along its inner surface by means of set screws or rivets. Tightening of the set screws or calking the rivets in a narrow interior of the extension is troublesome and requires much time.

SUMMARY OF THE INVENTION

It is an object of the invention to provide an improved mounting structure for a lubricating oil channel for an extension bushing of a transmission of a vehicle, which is capable of securing the channel to the extension in a single operation without requiring any fastening means such as set screws.

In order to achieve the object, a mounting structure for a lubricating oil channel for a bushing of an extension according to the invention comprises resilient anchoring means formed on the mid-portion of said channel, said channel having one end connected to an oil reservoir of a front casing and the other end connected to an oil aperture adjacent to said bushing of the extension, and a cavity formed in an inner wall of said extension capable of fitting therein said anchoring means resiliently deformed.

In order that the invention may be more clearly understood, preferred embodiments will be described, by way of example, with reference to the accompanying drawings.

BRIEF DESCRIPTION OF THE DRAWINGS

FIG. 7 is a plan view of a channel used in the transmission in FIG. 1 according to the invention;

FIG. 8 is a front elevation of the channel shown in FIG. 7;

FIG. 9 is a sectional view taken along the line IX—IX in FIG. 8; and

FIG. 10 is a sectional view taken along the line X—X in FIG. 8.

DETAILED DESCRIPTION OF THE PREFERRED EMBODIMENT

Figure 1:
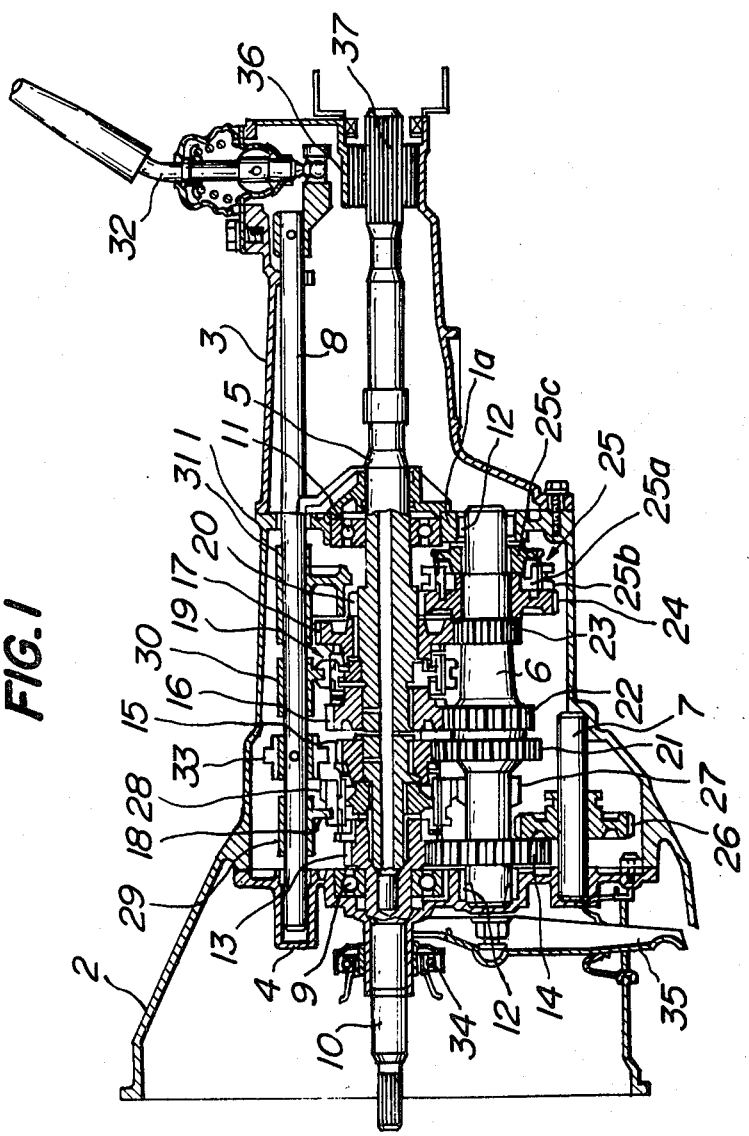
FIG. 1 is a sectional view of a transmission incorporating the mounting structure according to the invention.

Referring to FIG. 1 illustrating a cross-section of a transmission for an automobile incorporating present invention, the transmission comprises a transmission casing 1 integrally formed with a clutch housing 2, an extension 3 formed separately from the transmission casing 1 and bolted to the rear end thereof and a front cover 4 secured to a front surface of the transmission casing 1. The transmission casing 1, extension 3 and front cover 4 together form a gear housing within which a main shaft 5, a counter shaft 6, an idle shaft 7 and a fork rod 8 are longitudinally journalled in parallel with each other.

The main shaft 5 has a front end rotatably journaled in a hollow rear end of a main drive shaft 10 supported in a bearing 9 fitted in the front cover 4. The main shaft has an intermediate portion supported in a bearing 11 in a rear end wall of the transmission casing 1. The main shaft 5 also has and a rear end extending to the rear end of the extension 3. The counter shaft 6 has front and rear ends journaled in bearings 12 in the front cover 4 and the rear end wall 1a of the transmission casing 1, respectively. The idle shaft 7 is fixed at its ends to the front cover 4 and to a part of the transmission casing. The fork rod 8 extends over the combined lengths of the transmission casing 1 and extension 3 and is rotatively and axially movable within determined ranges.

The main drive shaft 10 is rotatively driven through a clutch (not shown) by an engine. The torque of the main drive shaft 10 is transmitted to the counter shaft 6 through a main drive gear 13, provided at the rear end of the main drive shaft, and a counter gear 14 in mesh with the main drive gear 13. On the main shaft 5 are provided a third or top gear 15, a second gear 16 and a first or low gear 17 loosely fitted thereon from the left to the right as viewed in FIG. 1. Synchromesh devices 18 and 19 are interposed between the main drive and third gears 13 and 15 and between the second and first gears 16 and 17, respectively. Moreover, an overdrive gear 20 is fixedly mounted on the main shaft 5 rearwardly adjacent to the first gear 17.

On the other hand, the counter shaft 6 is integrally formed with a third gear 21, a second gear 22 and a first gear 23 in mesh with the gears 15, 16 and 17, respectively. On the counter shaft on the rear side of the first gear 23 is loosely fitted an overdrive gear 24 in mesh with the overdrive gear 20. A synchromesh device 25 is mounted adjacent to the overdrive gear 24. The synchromesh device 25 comprises a synchronizing hub 25a connected to the overdrive gear 24 by means of spline grooves, a coupling sleeve 25b rotatable relative to the shaft 6, and a clutch gear 25c connected to the shaft 6 by means of spline grooves so as to be rotatable therewith.

A reverse idle gear 26 is loosely mounted on and is axially movable on the idle shaft 7 such that when the idle gear 26 has been shifted from the position shown in FIG. 1 to the right it is engaged with a reverse gear 27 integrally formed with the counter shaft 6 and a reverse gear 28 formed in an outer periphery of a coupling sleeve 18a of the synchromesh device 18, simultaneously.

On the fork rod 8 are loosely fitted forks 29, 30 and 31 having bosses whose ends are adjacent to each other and corresponding to the synchromesh devices 18, 19 and 25. When the fork rod 8 is rotated about its axis by means of a control lever 32, a shifter 33 integral with the fork rod 8 selects any one of the forks, which is then axially shifted by an axial movement of the fork rod 8. To the transmission casing 1 is pivoted a lever (not shown) having one end abutting against the reverse idle gear 26 and having the other end arranged beside the forks so that in reverse the lever is rocked by the shifter 33 to move the reverse idle gear 26 axially. FIG. 1 illustrates a release bearing 34 and a withdrawal lever 35.

Figure 2:
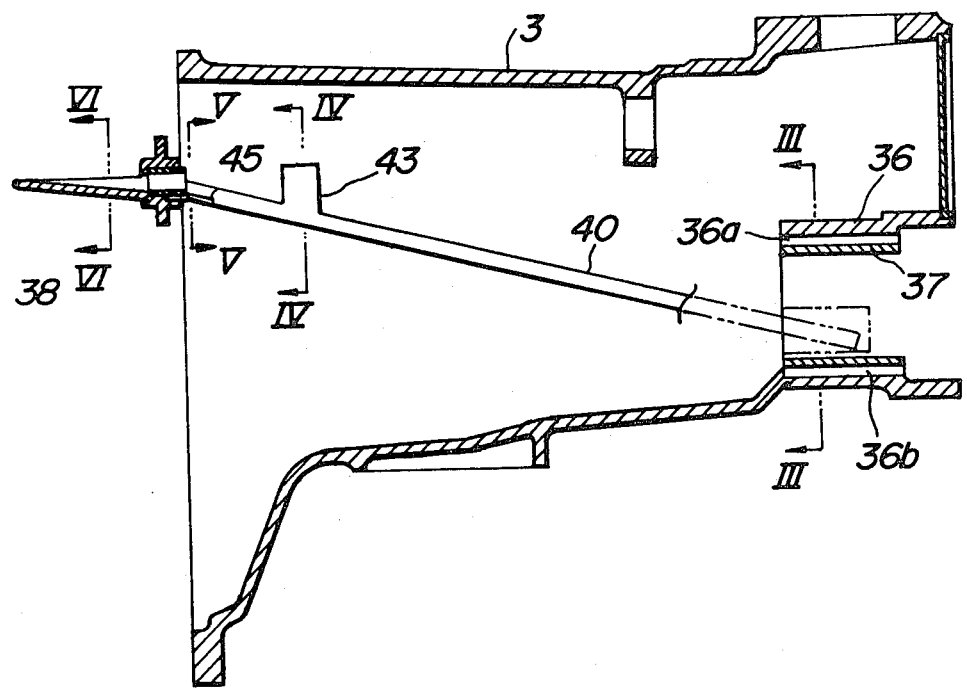
FIG. 2 is a sectional view of an extension in FIG. 1.

Referring to FIG. 2, showing the extension 3 on an enlarged scale, it will be seen that the extension is formed at its rear end with a bearing portion 36 with a bushing 37 fixed to the inside thereof for journaling the main shaft 5.

Figure 3:
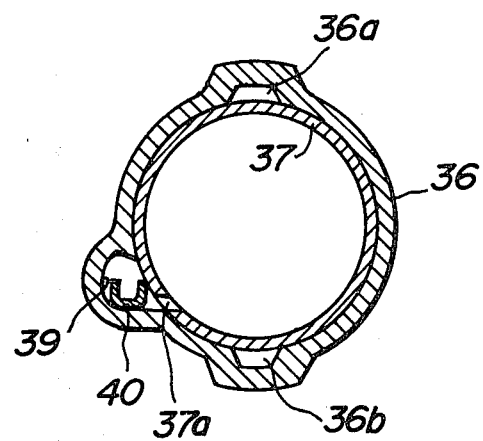
FIG. 3 is an enlarged sectional view taken along the line III—III in FIG. 2.
Figure 6:
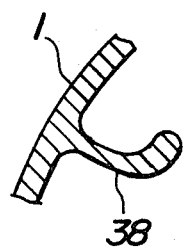
FIG. 6 is an enlarged sectional view taken along the line VI—VI in FIG. 2.

An inner wall of the transmission casing 1 is formed on the side of a viewer of the drawing with an oil reservoir 38 as shown in FIG. 6 which is communicated with a recess 39 for lubricant (FIG. 3) through a channel 40 through which the lubricant in the oil reservoir 38 is supplied to the inside of the bearing bushing 37 via the recess 39 and apertures 37a. The bearing portion 36 includes a vent hole 36a and an oil drain 36b.

The channel 40 is integrally made of a metal or a synthetic resin as shown in FIGS. 7 and 8. The channel 40 has a U-shaped cross-section whose sidewalls 41 surround a guiding groove 42 whose width progressively narrows toward the bushing 37. Each sidewall 41 is provided at its end adjacent to the side of the bushing with a slightly projecting wall 41a.

The end of the guiding groove 42 of the channel 40 adjacent to the reservoir 38 is wide and is formed with a bent portion 41b. One of the sidewalls 41 is integrally formed near the bent portion 41b with an anchoring portion 43 which comprises a connection piece 43a for connecting the anchoring portion 43 to the wall 41 and a cylindrical expansion 43b extending outwardly having a lug 43c covering the groove 42 of the channel 40 as shown in FIGS. 9 and 10. The diameter of the cylindrical expansion 43b progressively reduces toward the bushing 37.

Figure 4:
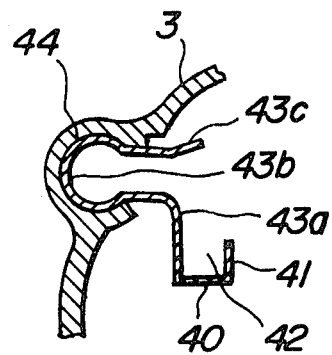
FIG. 4 is an enlarged sectional view taken along the line IV—IV in FIG. 2.

On the other hand, the inner wall of the extension 3 is formed with a fitting cavity 44 having a circular cross-section for fitting the cylindrical expansion 43b as shown in FIG. 4. The entrance of the fitting cavity is narrow in comparison with the cylindrical expansion 43b. The diameter of the fitting cavity 44 is less than that of the cylindrical expansion 43b. In the end of the reservoir 38 on the side of the extension is fitted and fixed a cylinder 45.

Figure 5:
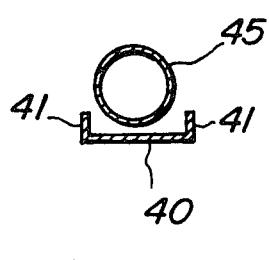
FIG. 5 is an enlarged sectional view taken along the line V—V in FIG. 2.

A mounting of the channel 40 constructed in the manner above described will now be explained. The lug 43c of the anchoring portion 43 and the bottom plate of the channel 40 are pressed toward each other by fingers so as to reduce the diameter of the cylindrical expansion 43b. The channel 40 under this condition is inserted into the extension 3 so that its end having the projecting walls 41a fits into the recess 39. Then, the channel 40 is returned in its axial direction to bring the wide end of the channel under the cylinder 45 as shown in FIG. 5. At the same time the cylindrical expansion 43b under the contracted condition is forced into the cavity 44 while being elastically deformed, and the cylindrical expansion 43b is then released in position in the fitting cavity so that it resiliently expands therein to exert a force against the inner wall of the fitting cavity for preventing it from being unintentionally removed therefrom. Moreover, as the diameter of the cylindrical expansion 43b is progressively reduced toward the bushing 37, the entire cylindrical expansion 43b is moved toward the bushing 37 to cause the cylindrical expansion to become tightly fitted within the fitting cavity.

As can be seen from the above explanation, according to the invention the anchoring portion 43 forms the mounting structure for the channel for the bushing lubricating oil which enables the channel to be attached and removed from the extension by a single operation without requiring any fastening means such as set screws.

It is further understood by those skilled in the art that the foregoing description is a preferred embodiment of the disclosed structure and that various changes and modifications may be made in the invention without departing from the spirit and scope thereof.

What is claimed is:

1. In a vehicle transmission housing having a lubricating oil channel connected at one end to an oil reservoir and connected at the other end adjacent to an element requiring lubrication, improved means for mounting the channel to the interior surface of the transmission housing comprising:
   (a) resilient anchoring means formed on said channel intermediate the channel ends;
   (b) an interiorly opening cavity formed in the interior surface of the transmission housing; and
   (c) said anchoring means and said cavity both having similar substantially C-shaped cross-sections which progressively taper in a direction parallel to the major dimension of the channel, said anchoring means being initially resiliently compressed and inserted into said cavity, and being subsequently expanded and prevented by its size and shape from being removed from said cavity.

2. The mounting means of claim 1 wherein said cavity is integrally formed in the inner wall of the transmission housing, said cavity interior diameter being larger than said cavity mouth diameter.

3. The mounting means of claim 2 wherein said anchoring means and said cavity are substantially shaped as telescoped tapering cylinders.

* * * * *